(12) United States Patent
Vermillion

(10) Patent No.: US 7,390,006 B1
(45) Date of Patent: Jun. 24, 2008

(54) TRAILER HITCH EXTENSION SYSTEM

(76) Inventor: Cecil E. Vermillion, 185 W. 7th Ave., Sun Valley, NV (US) 89433

( * ) Notice: Subject to any disclaimer, the term of this patent is extended or adjusted under 35 U.S.C. 154(b) by 225 days.

(21) Appl. No.: 11/229,134

(22) Filed: Sep. 19, 2005

(51) Int. Cl.
*B60D 1/155* (2006.01)
(52) U.S. Cl. .................................................. 280/482
(58) Field of Classification Search ................. 280/482, 280/491.2, 478.1
See application file for complete search history.

(56) References Cited

U.S. PATENT DOCUMENTS

| | | | | |
|---|---|---|---|---|
| 3,326,573 A | * | 6/1967 | Neitzey, Jr. | ................. 280/482 |
| 3,984,121 A | | 10/1976 | Dobosi | |
| 3,989,266 A | * | 11/1976 | Foster | ..................... 280/414.1 |
| 4,169,611 A | | 10/1979 | Smith et al. | |
| 4,726,601 A | | 2/1988 | Stevens | |
| 5,011,177 A | * | 4/1991 | Grice | ......................... 280/482 |
| 5,520,494 A | * | 5/1996 | Hughes | ...................... 414/477 |
| D372,001 S | | 7/1996 | Alford | |
| 6,302,425 B1 | | 10/2001 | Springer | |
| 2004/0075242 A1 | * | 4/2004 | Richards | .................. 280/478.1 |

\* cited by examiner

*Primary Examiner*—Tony H. Winner

(57) ABSTRACT

A trailer hitch extension system includes a trailer that has an elongated forward arm having a front end and a back end. The front end is open. A tubular member has a first end and a second end. A trailer hitch is attached to the first end. The second end is positioned in the forward arm. The first end is selectively positionable adjacent to the front end or spaced from the front end. A driving assembly is mechanically coupled to the tubular member and to the forward arm. The driving assembly is configured to selectively move the tubular member with respect to the forward arm.

4 Claims, 5 Drawing Sheets

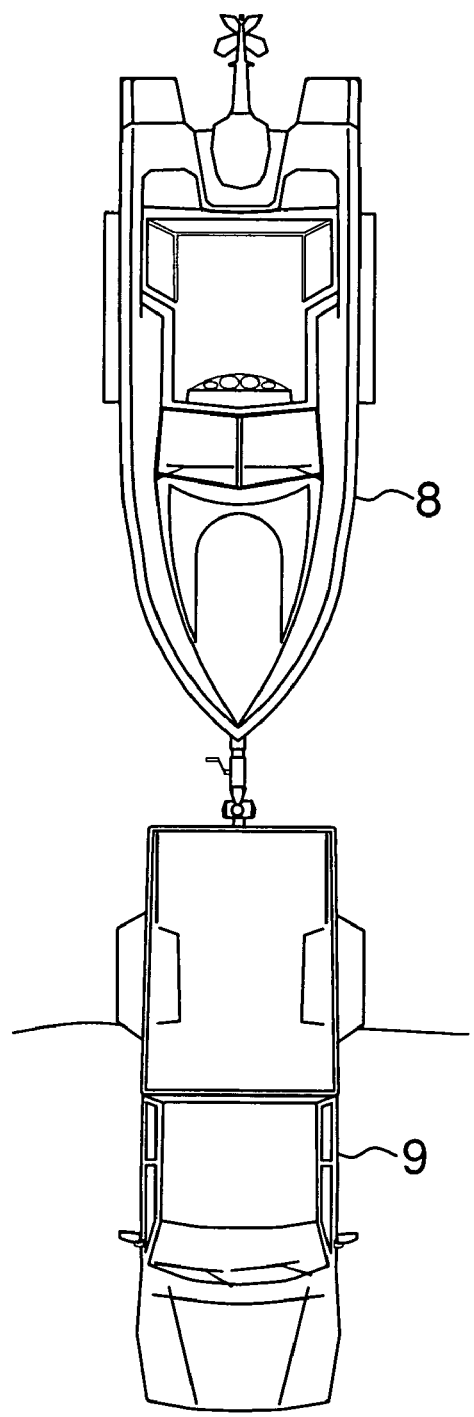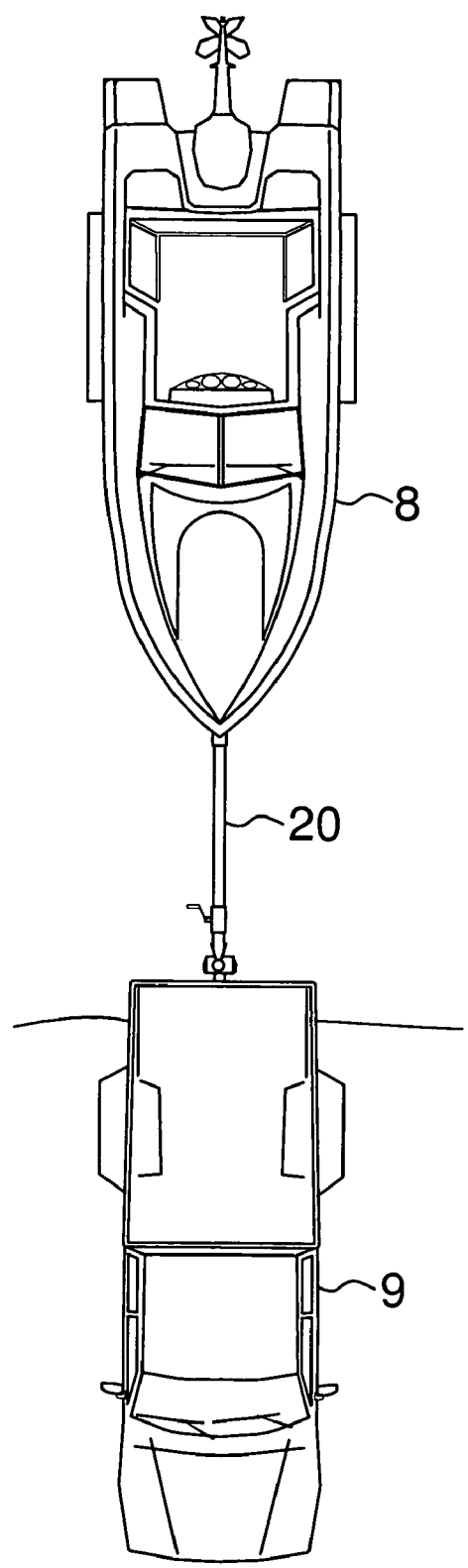
FIG. 1
FIG. 2

TRAILER HITCH EXTENSION SYSTEM

BACKGROUND OF THE INVENTION

1. Field of the Invention

The present invention relates to trailer and hitch devices and more particularly pertains to a new trailer and hitch device for extending a trailer into a body of water when a boat is to be loaded onto a trailer so that a vehicle pulling the trailer may remain on dry land.

2. Description of the Prior Art

The use of trailer and hitch devices is known in the prior art. U.S. Pat. No. 3,984,121 describes a trailer that includes a movable section which may be used when loading or unloading a trailer. Another type of trailer and hitch device is U.S. Pat. No. 4,169,611 that includes an extendable trailer tongue for increasing the length of a trailer. Another such device is found in U.S. Pat. No. 4,726,601. Still yet another such device is found in U.S. Pat. No. 5,011,177.

While these devices fulfill their respective, particular objectives and requirements, the need remains for a device that allows a person to extend their trailer into a body of water during the retrieval of a boat so that the vehicle does not have to back into the water during the loading of the boat. This will place the vehicle on drier land and will prevent slippage by the vehicle to greatly assist the vehicle in the removal of the loaded trailer from the water.

SUMMARY OF THE INVENTION

The present invention meets the needs presented above by generally comprising a trailer that has an elongated forward arm having a front end and a back end. The front end is open. A tubular member has a first end and a second end. A trailer hitch is attached to the first end. The second end is positioned in the forward arm. The first end is selectively positionable adjacent to the front end or spaced from the front end. A driving assembly is mechanically coupled to the tubular member and to the forward arm. The driving assembly is configured to selectively move the tubular member with respect to the forward arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a trailer hitch extension system according to the present invention in a retracted position during the unloading of a boat.

FIG. 2 is a top view of the present invention in an extended position during the loading of a boat.

DESCRIPTION OF THE PREFERRED EMBODIMENT

Figure 3:
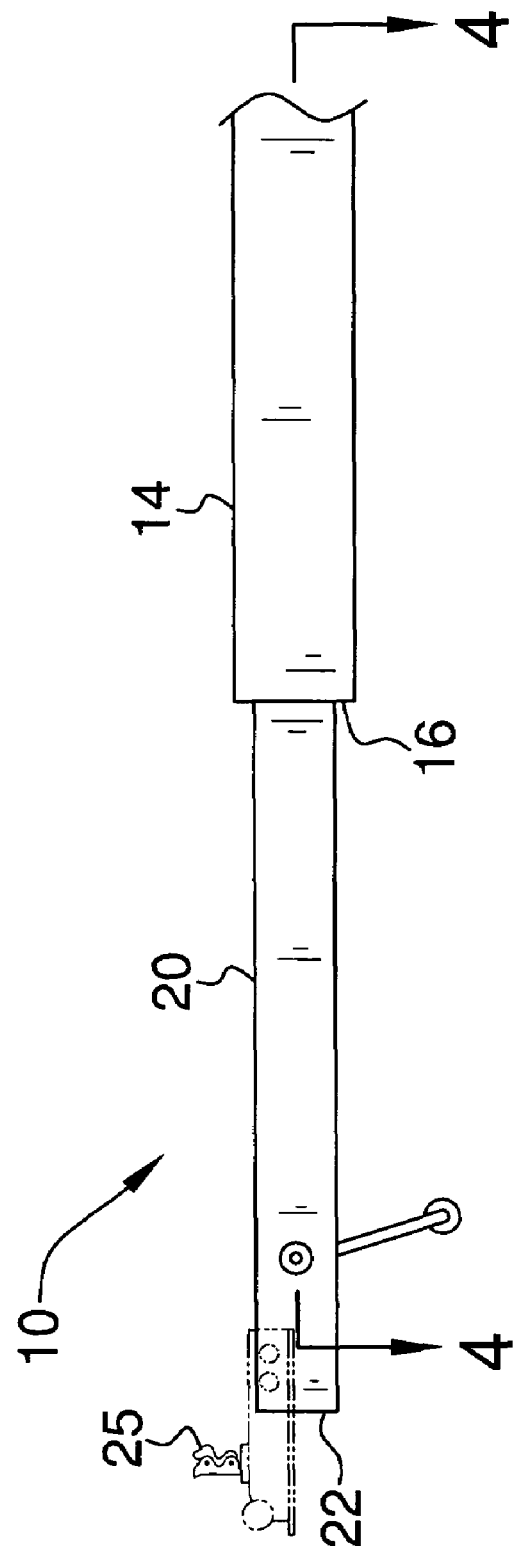
FIG. 3 is a side view of the present invention.
Figure 4:
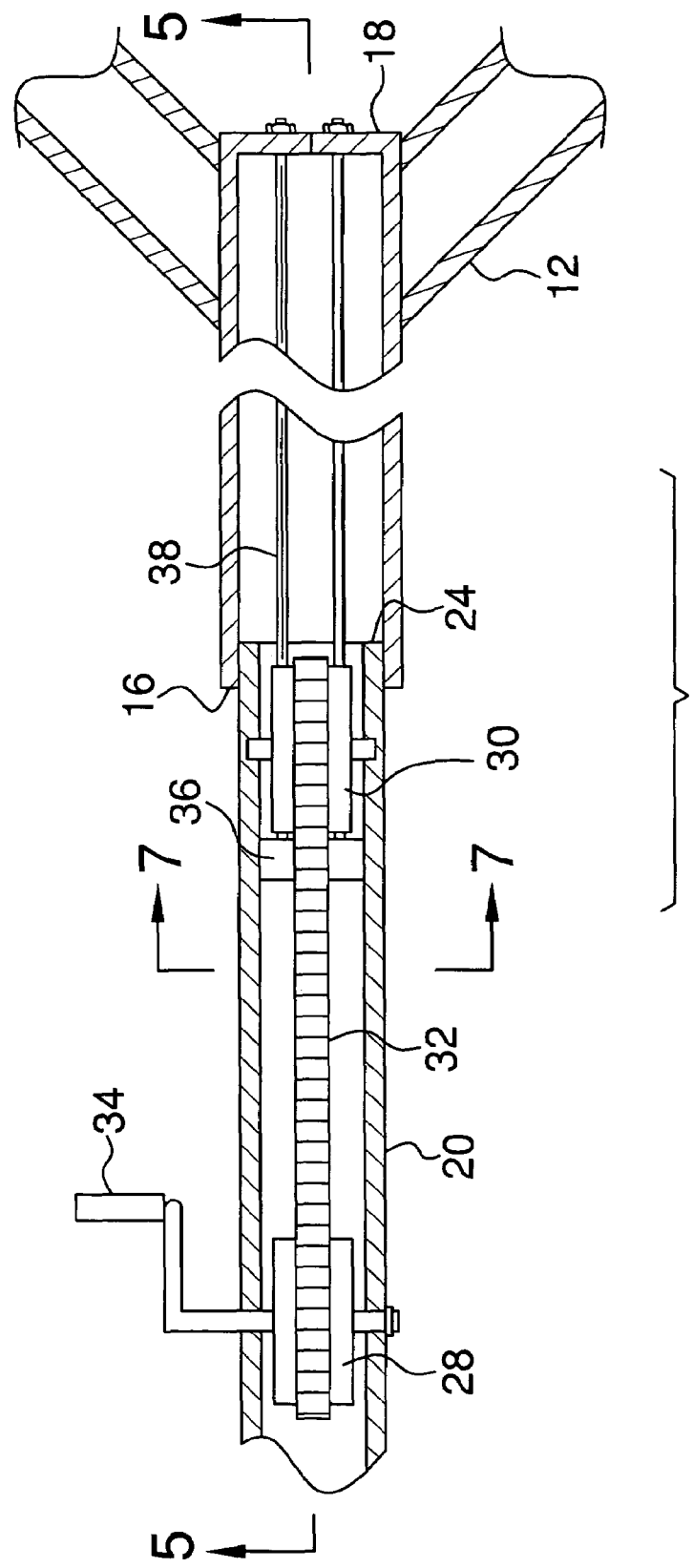
FIG. 4 is a cross-sectional view taken along line 4-4 of FIG. 3 of the present invention.
Figure 5:
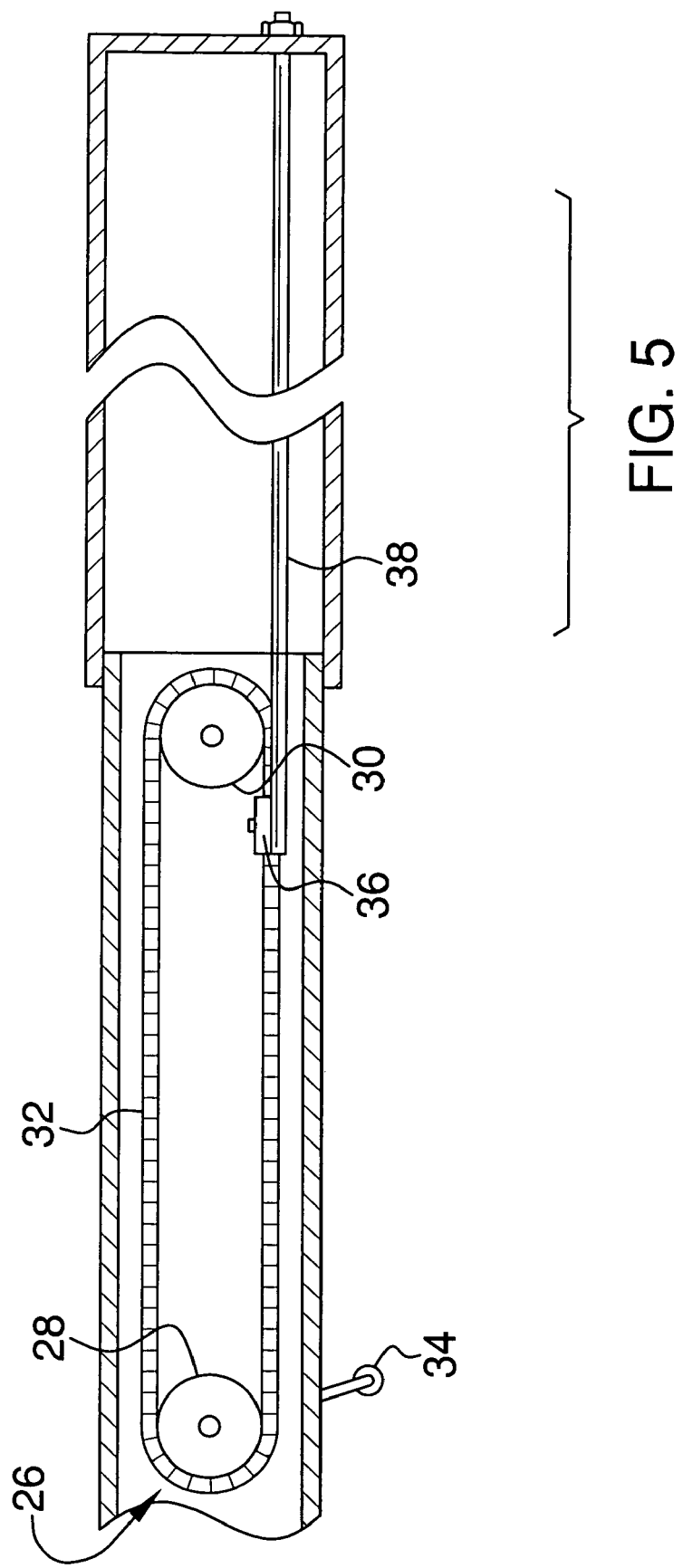
FIG. 5 is a cross-sectional view taken along line 5-5 of FIG. 4 of the present invention.
Figure 6:
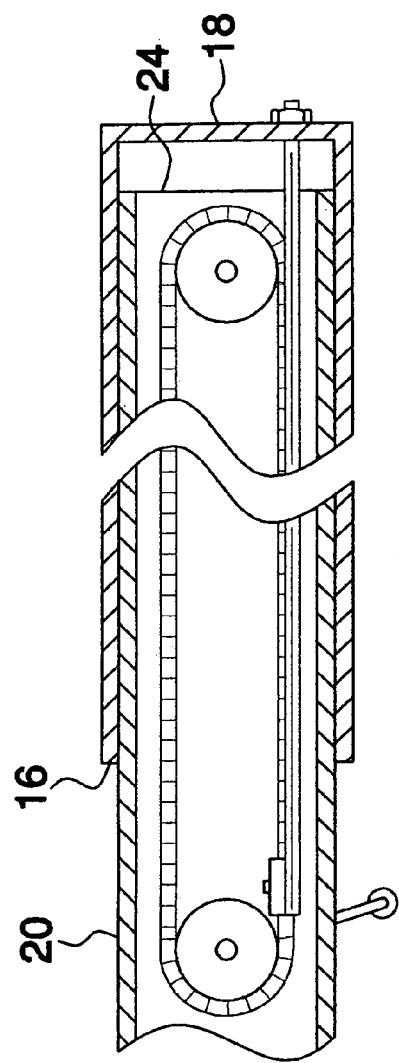
FIG. 6 is a cross-sectional view of the present invention in the retracted position.
Figure 7:
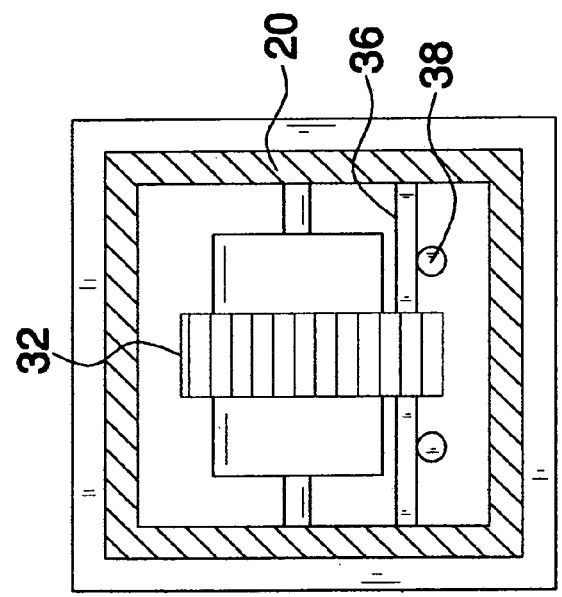
FIG. 7 is a cross-sectional view taken along line 7-7 of FIG. 1 of the present invention.

With reference now to the drawings, and in particular to FIGS. 1 through 7 thereof, a new trailer and hitch device embodying the principles and concepts of the present invention and generally designated by the reference numeral 10 will be described.

As best illustrated in FIGS. 1 through 7, the trailer hitch extension system 10 generally comprises a generally conventional trailer 12 that has an elongated forward arm 14 having a front end 16 and a back end 18. The front end 16 is open. A tubular member 20 has a first end 22 and a second end 24 wherein a trailer hitch 25 is attached to the first end 22. The second end 24 is positioned in the forward arm 14. The first end 22 is selectively positionable adjacent to the front end 16 or spaced from the front end 16. The tubular member 20 has a length generally between 3 feet and 8 feet.

A driving assembly 26 is mechanically coupled to the tubular member 20 and to the forward arm 14. The driving assembly 26 is configured to selectively move the tubular member 20 with respect to the forward arm 14. The driving assembly 26 comprises a first gear 28 that is rotatably mounted in the tubular member 20 and is positioned adjacent to the first end 22. A second gear 30 is rotatably mounted in the tubular member 20 and is positioned adjacent to the second end 24. The first 28 and second 30 gears each have an axis of rotation that is orientated parallel to each other and perpendicular to a longitudinal axis of the tubular member 20. A chain 32 extends around and is engaged to the first 28 and second 30 gears. An actuating handle 34 extends through the tubular member 20 and is attached to the first gear 28. The first gear 28 rotates in a same direction as a rotation of the actuating handle 34. A plate 36 is attached to the chain 32 and is positioned between the first 28 and second 30 gears. An elongated rod 38 extends between and is attached to each of the plate 36 and the back end 18. The elongated rod 38 may include a pair of elongated rods. The plate 36 is positioned adjacent to second gear 30 when the tubular member 20 is in an extended position and positioned adjacent to the first gear 28 when the tubular member 20 is in a retracted position.

In use, the hitch 25 and trailer 12 are used in a conventional manner to pull a boat. When a person wants to pull a boat 8 out of the water, the tubular member 20 is placed in the extended position so that the vehicle 9 to which the hitch 25 is coupled does not have to back into the water as far as would be required if the tubular member 20 was in the retracted position. Once the boat 8 is placed on the trailer 12, the actuating handle 34 is rotated to place the tubular member 20 in the retracted position and pull the boat 8 out of the water, or at least toward the vehicle 9. It will then be relatively easier for the to pull away from the shoreline because the vehicle 9 will be on drier land.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch extension system comprising:
   a trailer having an elongated forward arm having a front end and a back end, said front end being open;
   a tubular member having a first end and a second end wherein a trailer hitch is attached to said first end, said second end being positioned in said forward arm, said first end being selectively positionable adjacent to said front end or spaced from said front end; and
   a driving assembly being mechanically coupled to said tubular member and to said forward arm, said driving assembly being configured to selectively move said tubular member with respect to said forward arm; said driving assembly including:
   a first gear being rotatably mounted in said tubular member and being positioned adjacent to said first end;
   a second gear being rotatably mounted in said tubular member and being positioned adjacent to said second end, said first and second gears each having an axis of rotation orientated parallel to each other and perpendicular to a longitudinal axis of said tubular member;
   a chain extending around and being engaged to said first and second gears, said chain being mechanically coupled to said forward arm such that rotation of said first gear moves said tubular member with respect to said forward arm
   a plate being attached to said chain and being positioned between said first and second gears; and
   an elongated rod extending between and being attached to each of said plate and said back end, said plate being positioned adjacent to second gear when said tubular member is in an extended position and positioned adjacent to said first gear when said tubular member is in a retracted position, said chain, plate and rod preventing complete removal of said arm forward from said tubular member.

2. The system according to claim 1, wherein said tubular member has a length generally between 3 feet and 8 feet.

3. The system according to claim 1, further including an actuating handle extending through said tubular member and being attached to said first gear, said first gear rotating in a same direction as a rotation of said actuating handle.

4. A trailer hitch extension system comprising:
   a trailer having an elongated forward arm having a front end and a back end, said front end being open;
   a tubular member having a first end and a second end wherein a trailer hitch is attached to said first end, said second end being positioned in said forward arm, said first end being selectively positionable adjacent to said front end or spaced from said front end, said tubular member having a length generally between 3 feet and 8 feet;
   a driving assembly being mechanically coupled to said tubular member and to said forward arm, said driving assembly being configured to selectively move said tubular member with respect to said forward arm, said driving assembly comprising;
   a first gear being rotatably mounted in said tubular member and being positioned adjacent to said first end;
   a second gear being rotatably mounted in said tubular member and being positioned adjacent to said second end, said first and second gears each having an axis of rotation orientated parallel to each other and perpendicular to a longitudinal axis of said tubular member;
   a chain extending around and being engaged to said first and second gears;
   an actuating handle extending through said tubular member and being attached to said first gear, said first gear rotating in a same direction as a rotation of said actuating handle;
   a plate being attached to said chain and being positioned between said first and second gears; and
   an elongated rod extending between and being attached to each of said plate and said back end, said plate being positioned adjacent to second gear when said tubular member is in an extended position and positioned adjacent to said first gear when said tubular member is in a retracted position, said chain, plate and rod preventing complete removal of said arm forward from said tubular member.

* * * * *